B. A. CARLSEN.
AXLE.
APPLICATION FILED DEC. 8, 1909.
1,001,349.
Patented Aug. 22, 1911.
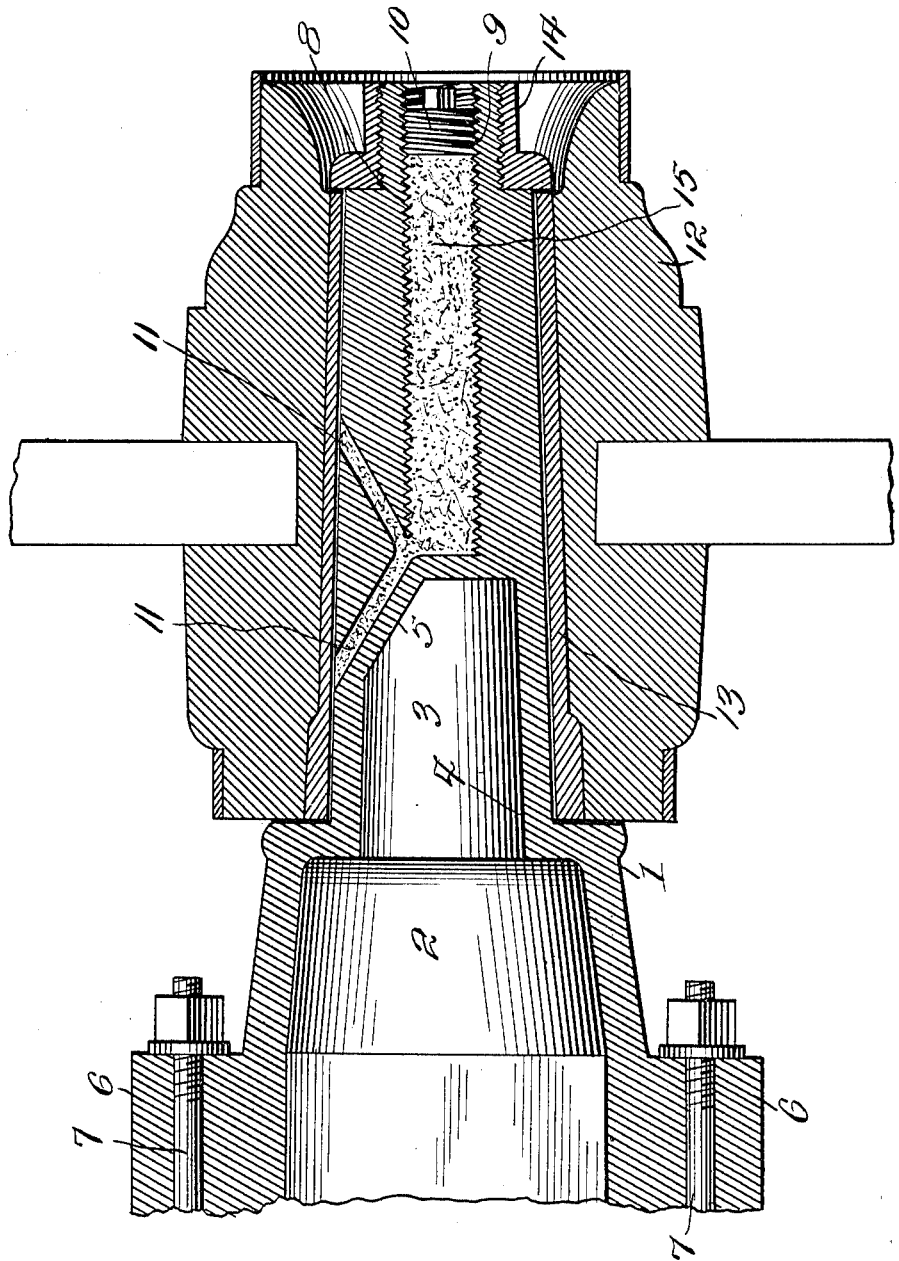
Witnesses
J. L. Wright
D. W. Gould.
Inventor
Benjamin A. Carlsen
By Victor J. Evans,
Attorney

UNITED STATES PATENT OFFICE.

BENJAMIN A. CARLSEN, OF SIOUX FALLS, SOUTH DAKOTA.

AXLE.

1,001,349. Specification of Letters Patent. Patented Aug. 22, 1911.

Application filed December 8, 1909. Serial No. 532,002.

*To all whom it may concern:*

Be it known that I, BENJAMIN A. CARLSEN, a citizen of the United States, residing at Sioux Falls, in the county of Minnehaha and State of South Dakota, have invented new and useful Improvements in Axles, of which the following is a specification.

The invention relates to an improved axle, being more particularly directed to a construction whereby the lubrication of the wheel mounted on the axle may be simply and expeditiously accomplished by directing for such lubrication any desired portion of the lubricant carried by the axle.

The main object of the present invention is the provision of an axle formed to provide a lubricant chamber in which is stored a quantity of more or less solid lubricant, the chamber communicating with the exterior or bearing surface of the axle by means of a plurality of channels, the construction including a simple means whereby the lubricant in the chamber may be forced lengthwise the same to feed the lubricant out through the channels.

The invention in its preferred details of construction will be described in the following specification, reference being had particularly to the accompanying drawings, in which the figure comprises a sectional view, partly in elevation, showing the axle and wheel hub coöperating therewith.

Referring particularly to the accompanying drawing, my improved axle comprises a metallic body 1 designed to be secured upon the terminal of a wooden axle 2 in the usual manner. For this purpose I prefer to provide the wooden axle with a comparatively short projection 3 designed to fit an opening 4 formed in the body, the portion of the contacting surfaces of the projection and opening being inclined at 5 to insure a proper position of the axle 1 to advantageously locate the lubricant channels hereinafter noted. The metallic axles are provided with the usual annular flanges 6, the flange of one axle being connected by a truss rod 7 with the flange of the other axle to secure them in applied positions.

In advance of the opening 4 in the metallic axle, the latter is formed with a longitudinal bore 8 interiorly threaded at 9 and hereinafter termed the lubricant chamber. The chamber 8 opens through the forward end of the metallic axle and terminates at its rear end slightly in advance of the forward end of the opening 4. A solid plug 10 is designed for threaded connection with the wall of the chamber, said plug operating as a plunger to force the lubricant longitudinally of the chamber, as will presently appear. Adjacent the rear end of the lubricant chamber the metallic axle is formed with divergent channels 11 which communicate at their inner ends with the chamber and open at their outer ends through relatively spaced portions of the metallic axle. The inclined portion 5 of the metallic body forms one wall of one of the chambers 11 and the said inclined portion serves the double purpose of insuring the proper position of the axle 3 with respect to the metallic body 1 and provides means whereby the lubricating channels may be properly located.

The wheel hub 12 is interiorly provided with the usual boxing 13 designed to fit and bear upon the outer surface of the body 1, the boxing being secured against endwise movement on the body by the usual nut 14.

In use, solid or semi-solid lubricant 15 is arranged in the chamber 8 and the channels 11 are also preferably filled with such lubricant. The plunger plug 10 is inserted, being formed to permit operation by any suitable type of wrench. When it is desired to lubricate the wheel the plunger is screwed into the chamber forcing the lubricant therein through the channels 11, directing such lubricant between the boxing and surface of the axle.

It is obvious that a comparatively large quantity of lubricant may be carried in each axle and that sufficient for each day's lubrication may be forced from the channel by a comparatively small inward movement of the plunger. By this means and the use of a conveniently carried wrench, any wheel may be readily and conveniently lubricated at any time or place in a simple, expeditious manner.

The invention is applicable to any wheel vehicle, and in this connection it is to be noted that the channels 11 open upwardly from the chamber so that a semi-solid lubricant may be used as conveniently and as expeditiously as a solid one.

Having thus described the invention, what is claimed as new, is:—

An axle formed with a diametrically reduced extension, said extension being formed in part to provide an inclined surface, a metallic body adapted to be positioned upon the axle and projected beyond the same to receive and support a wheel, said body being hollow for a portion of its length, the wall of said hollow portion being formed in part to provide an inclined surface to coöperate with the inclined portion of the axle projection to fix the position of the body on the axle, said body in advance of the hollow portion being formed with a longitudinal bore communicating with the surface of the body through a plurality of diverging channels, one of said channels being parallel to the inclined wall of the hollow portion of the body, one wall of said channel being formed by said inclined wall of the body, and a plug having threaded engagement with the interior of the bore whereby the lubricant may be delivered to said channels, and distributed on the axle.

In testimony whereof I affix my signature in presence of two witnesses.

BENJAMIN A. CARLSEN.

Witnesses:
 TORE TEIGEN,
 CARL HOWE.

---

Copies of this patent may be obtained for five cents each, by addressing the "Commissioner of Patents, Washington, D. C."